United States Patent [19]

Hagin et al.

[11] Patent Number: 4,778,020

[45] Date of Patent: Oct. 18, 1988

[54] UTILITY VEHICLE DESIGNED FOR FREQUENT STARTING AND STOPPING

[75] Inventors: Faust Hagin; Hans Drewitz, both of Munich, Fed. Rep. of Germany

[73] Assignee: MAN Nutzfahreuge GmbH, Munich, Fed. Rep. of Germany

[21] Appl. No.: 54,487

[22] Filed: May 27, 1987

[30] Foreign Application Priority Data

Jun. 11, 1986 [DE] Fed. Rep. of Germany ....... 3619640

[51] Int. Cl.$^4$ ..................... B60K 17/06; B60R 16/08
[52] U.S. Cl. ..................................... 180/53.4; 180/306
[58] Field of Search ....................... 180/53.4, 306, 307

[56] References Cited

U.S. PATENT DOCUMENTS

| | | | |
|---|---|---|---|
| 3,104,528 | 9/1963 | Horig | 180/53.4 |
| 3,488,947 | 1/1970 | Miller et al. | 180/307 |
| 4,227,587 | 10/1980 | Carman | 180/306 |
| 4,313,351 | 2/1988 | Hagin | 74/687 |

FOREIGN PATENT DOCUMENTS 901091 2/1982 U.S.S.R. .............. 180/53.4

Primary Examiner—Kenneth R. Rice
Attorney, Agent, or Firm—Roberts, Spiecens & Cohen

[57] ABSTRACT

The invention is concerned with improvements in utility vehicles having hydraulically driven items of equipment and designed for frequently stopping and starting, such as a garbage collection vehicle, a forklift truck, an excavator or the like. In order to facilitate operation of the equipment the vehicle has its engine connected with a hydromechanical four-shaft power branching transmission as previously proposed for use in city omnibuses operating city services. The branching transmission is adapted for operation in at least two working ranges and has at least two hydroconverters. The one hydroconverter is connected with a power output shaft at least in the starting up state of the vehicle. A second hydroconverter is connected with a shaft different to the transmission input shaft and the transmission output shaft. The pumps of the hydraulic power circuitry for operation of the equipment of the vehicle are able to be connected via clutch with the shaft of a hydroconverter, more especially of the second hydroconverter. This avoids the necessity of having a special auxiliary output transmission driven by the engine.

3 Claims, 2 Drawing Sheets

UTILITY VEHICLE DESIGNED FOR FREQUENT STARTING AND STOPPING

FIELD OF THE INVENTION

The invention relates to utility vehicles of the type fitted with hydraulic power circuitry for driving equipment, such as garbage collection vehicles, forklift trucks, wheel loaders, excavators and the like having to make frequent starts and stops and comprising a drive engine, a transmission and a secondary power output with which via at least one clutch the drive shaft of an equipment driving pump may be connected as required for the operation of such equipment.

DESCRIPTION OF PRIOR ART

In such a vehicle the main drive train consists of an engine, a variable speed transmission and a driven axle. The secondary power train consists of the vehicle engine, a branching transmission and auxiliary devices, connected and disconnected by mens of a clutch, as for example one or more pumps for supplying the equipment on the vehicle. This leads to certain disadvantages: the engine is as a rule designed to have a power output sufficient for driving the vehicle but the power requirements of the equipment for supplying the devices are generally much lower so that there is a very unfavorable operating point in the performance characteristic of the drive engine. The effect of such operation of the drive engine in the lower partial load range is well known, i.e. that there is a relatively high fuel consumption and high emission rate of noxious substances. Moreover, known designs are comparatively expensive owing to the corresponding complexity of the secondary power output; a further factor is that the auxiliary drive requires a substantial amount of space and respective adaptations both on the engine side and also on the transmission side thereof.

SUMMARY OF THE INVENTION

Accordingly, one object of the present invention is to provide a utility vehicle of the type described having to make frequent starts and stops whose drive system, on the one hand, ensures a satisfactory mileage when driving on the road and, on the other hand, provides for a low power drive of the secondary devices for the equipment on the vehicle.

A further object of the invention is to provide such a vehicle fulfilling such requirements while at the same time having a low emission rate of noxious substances.

In order to achieve these and other objects of the invention a vehicle of the type described is characterized in that the transmission is in the form of a four-shaft hydromechanical power branching transmission with at least two operational ranges and including at least two hydrconverters, one hydroconverter being operationally connected at least in the drive-away range of the vehicle with an output shaft and is stationary when the vehicle is stationary, while a second hydroconverter is connected with a shaft other than the transmission input shaft and the transmission output shaft, and the shaft for driving the pump or pumps of the operating hydraulic system is able to be connected via the clutch with the shaft of the hydroconverter.

The following description of the invention and its advantages is given in more detail with reference to two working embodiments as shown in the drawings.

BRIEF DESCRIPTION OF THE SEVERAL VIEW OF THE DRAWINGS

Figure 1:
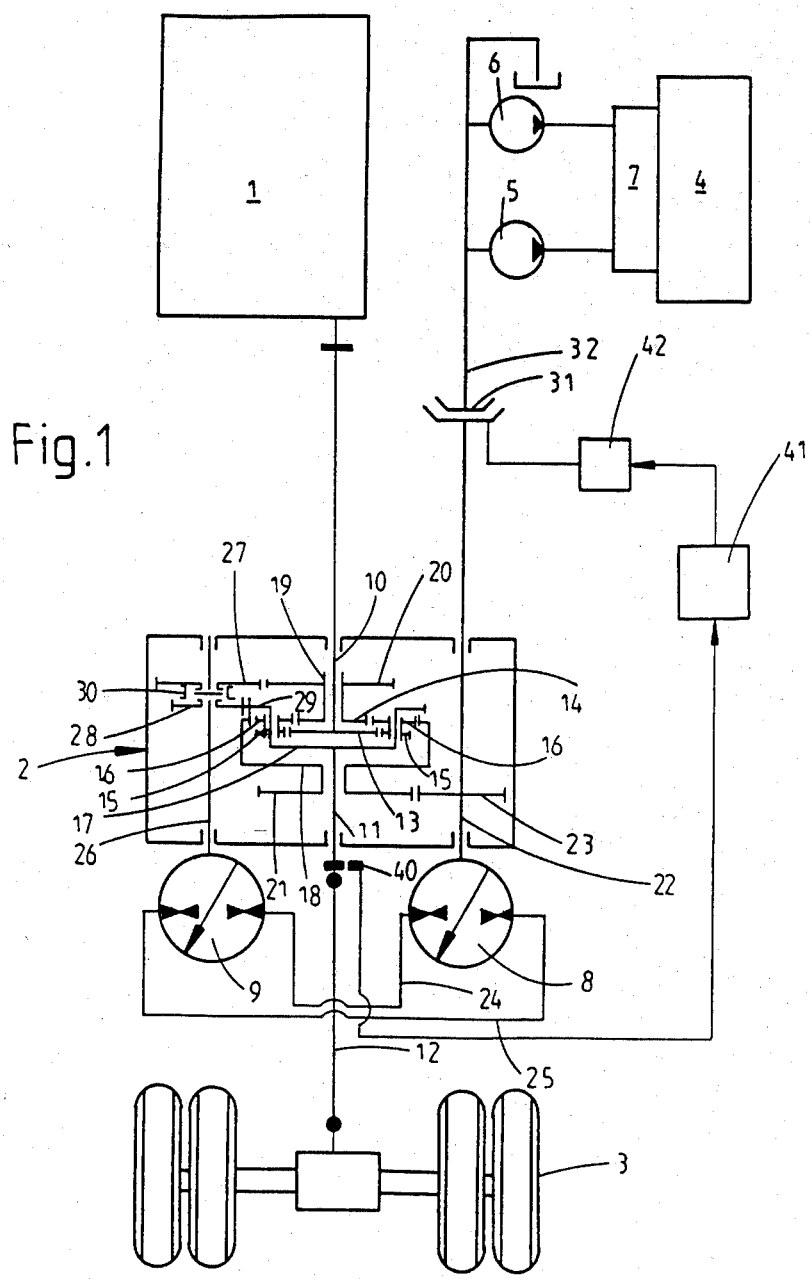
FIG. 1 is a generally diagrammatic view of a first working example of the invention in the form of a drive for a vehicle having to frequently start and stop.

DETAILED DESCRIPTION OF THE INVENTION.

In the drawings like parts are denoted by like reference numerals.

In the drawings reference numeral 1 denotes a drive engine, more especially in the form of a diesel engine, reference 2 denotes a transmission in the form of a variable speed gearbox and 3 denotes one driven axle of a utility vehicle adapted for operation in which very frequent starts and stops are necessary. Such a vehicle may, for example, be in the form a garbage collection vehicle, a forklift truck, a wheel loader, an excavator or the like. The utility or commercial vehicle has equipment generally denoted by reference 4, as for example lifting means, pressing means, excavator or wheel loader shovels or the like operated by a hydraulic power circuitry. This drive circuitry includes one or more pumps 5 and 6 to provide the necessary working pressure at auxiliary control devices 7, by which the equipment 4 is operated. In this respect it is a question of hydraulic actuators designed for lifting, pressing or tilting.

The transmission 2 is in the form of a four-shaft hydromechanical power branching transmission which has at least two working ranges and two hydroconverters 8 and 9. Such transmissions have so far in most cases been employed in omnibuses on regular services with frequent halts. In this respect an input shaft connected with the drive engine 1 is referenced 10 and an output shaft is referenced 11, which is connected with the axle drive train 12. The epicyclic differential transmission 2 furthermore comprises a large sun wheel 13 permanently connected with the input shaft 10, a small sun wheel 14, a plurality of double planetary wheel 15 and 16 each mounted on a hollow shaft, a cage 17 permanently connected with the output shaft 11 and a hollow wheel 18 or annulus, which has internal teeth meshing with the planetary wheels 16. The small sun wheel 14 is keyed on a hollow shaft 19 which is rotatable on the input shaft 10 and furthermore bears a gearwheel 20. A gearwheel 21 is fixedly connected with the annulus, and wheel 21 is, in turn, in mesh with a gearwheel 23 keyed on a shaft 22. The shaft 22 constitutes a mechanical connection with the hydroconverter 8. The latter, like the hydroconverter 9, may be run in either direction both as a motor and also as a pump and is connected with the hydroconverter 9 via hydraulic lines 24 and 25. The gearwheel 20 mounted on the hollow shaft 19 is in mesh with a gearwheel 27 rotatable on a shaft 26. The shaft 26 constitutes a mechanical connection between the hydroconverter 9 and the planetary differential transmission 2. Furthermore there is an additional gearwheel 28 on the shaft 26 which is in mesh with a gearwheel 29 fixed on the cage 17. Numeral 30 denotes a two-way clutch which may be operated so as either to couple the gearwheel 28 with the shaft 26 or (in a further position) to couple the gearwheel 27 with the shaft 26. Between the two operational states of the clutch 30 there is a neutral setting in which neither the gearwheel 27 nor the gearwheel 28 is drivingly connected with the shaft 26.

The speed of the transmission output shaft 11 is the mathematical sum of the speeds of the large sun wheel 13 and of the internal gearwheel 18 or annulus, which determine the speed of rotation of the axes of the planetary wheels 15 and 16, and thus of the cage or planet carrier 17. Owing to the gearwheels 23 and 21 the speed and the direction of the hydroconverter 8 are controlling for the speed and direction or rotation of the annulus 18.

MANNER OF OPERATION OF FIRST EMBODIMENT OF THE INVENTION

With reference to FIG. 1 the case will be considered in which the vehicle is to be accelerated. The hydroconverter 8 is then operated as a pump in a first operating range of the power branching transmission 2 ($\eta_{output}:\eta_{input}$ is less than or equal to 50%), the direction of rotation of the annulus 18 being opposite to the direction of rotation of the large sun wheel 13, so that this converted power is supplied via the lines 24 and 25 to the hydroconverter 9. The latter then drives the shaft 26. The two-way clutch 30 is then in a state in which the gearwheel 28 is coupled with the shaft 26 and the driving connection via the gearwheel 29 and the cage 17 is completed for the supply of power to the transmission output shaft 11.

In a second working range ($\eta_{output}:\eta_{input}$ is greater than or equal to 50%) in which the annulus 18 and the sun wheel 13 are turning in the same direction, the hydroconverter 8 runs as a motor and receives its driving power via the lines 24 and 25 from the hydroconverter 9, which operates as a pump in this range. The two-way clutch 30 is then in a condition in which the gearwheel 27 is coupled with the shaft 26. In this case the hydroconverter 9 thus receives its power via the double planetary wheels 15 and 16, and the hollow shaft 19 with the gearwheels 14 and 20 from the large sun wheel 13.

When the hydroconverter 8 is, practically all the power is transmitted mechanically by the planetary differential. In this state there is a switch over of the two-way clutch 30 from the gearwheel 28 to the gearwheel 27 when the speed of the transmission output shaft 11 increases and conversely there is a switch over from the gearwheel 27 to the gearwheel 28 when it decreases.

When the vehicle is not moving, the hydroconverter 9 will be stationary too. In this case the hydroconverter 8 will operate at a rate which is proportional to the speed of the drive engine 1. This fact has been taken advantage of in the invention, for, if in this state the items of equipment 4 of the vehicle are to be started, then in accordance with the invention this is caused using a clutch 31 by coupling the suitably extended shaft 22 with the drive shaft 32 of the pumps 5 and 6. The latter will then supply power to the hydraulic equipment 7. The power then to be supplied by the drive engine 1 for the operation of the equipment 4 is then comparatively low and the engine will have no difficulty in supplying it even when rotating at a low speed.

DETAILED DESCRIPTION OF THE SECOND EMBODIMENT OF THE INVENTION

Figure 2:
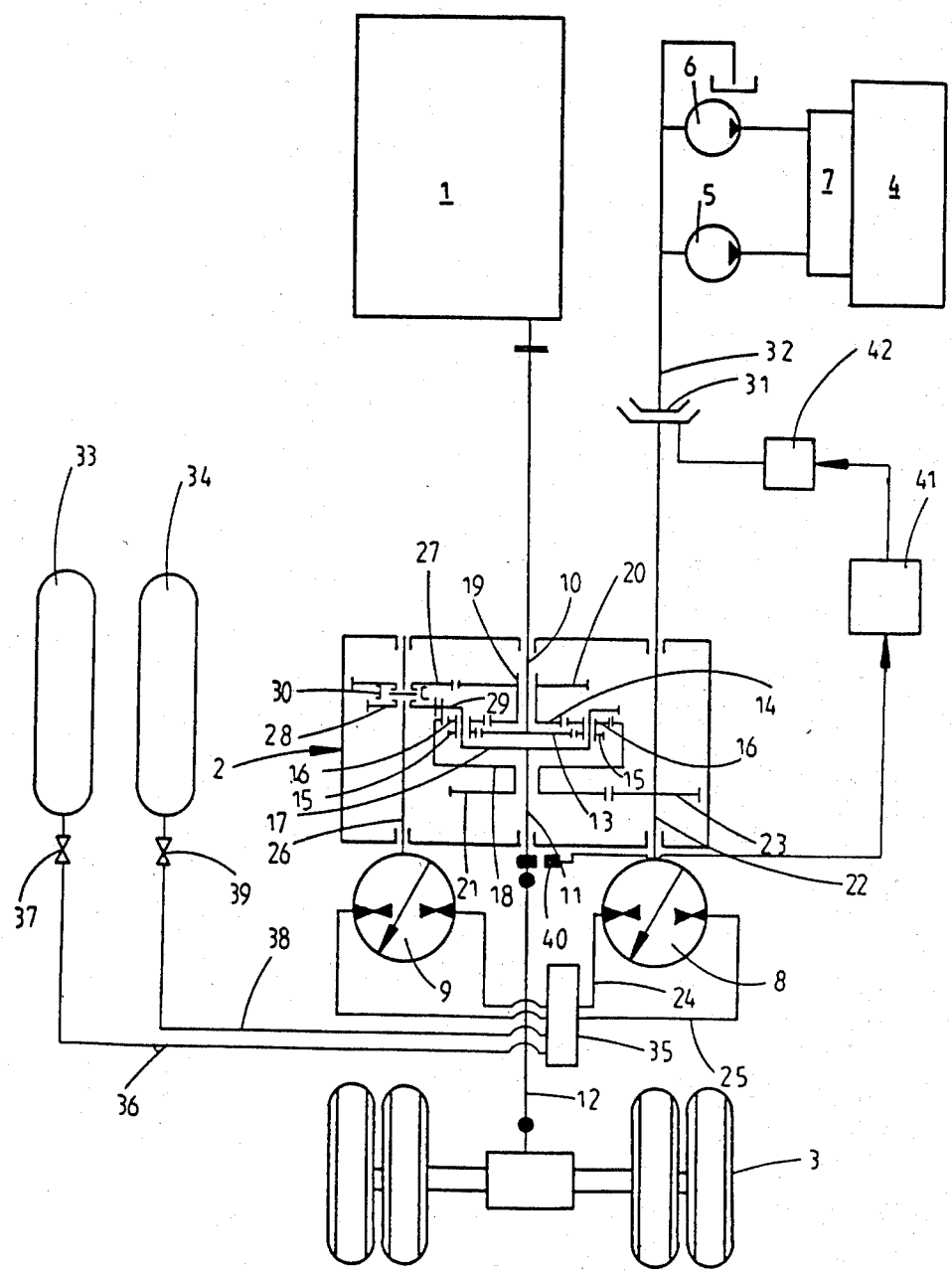
FIG. 2 shows a second design of a vehicle that frequently has to start and stop.

The vehicle shown in FIG. 2 differs from that of FIG. 1 in that there are various parts associated with the hydromechanical power branching transmission 2 for forming a brake energy recovery device. Such a brake energy recovery device has so far only been proposed in conjunction with omnibuses for city services. In the present case these additional parts compris a high pressure accumulator 33, a low pressure accumulator 34, a controller 35, and a line 36 leading to the high pressure accumulator 33 and branching from the latter. This line 36 has a controlled shut off valve 37. There is also a supply line 38 (having a controlled shut off valve 39 thereon) leading to the low pressure accumulator 34 and branching from the controller 35. As regards the charging of the high pressure accumulator 33, when braking, and discharge of the high pressure accumulator 33 when the vehicle is getting under way or starting, the connection together and function of these additional means are familiar to those in the omnibus art.

For operation of the equipment 4 of the vehicle, the provision of the brake energy recovery device involves the additional advantage that the hydraulic power circuitry of the equipment 4 may be supplied with power not only from the drive engine 1 but also from the high pressure accumulator 33 providing that the latter is suitably charged. If it is charged then the high pressure accumulator may supply power by discharging to the hydroconverter 8, which will then operate as a motor and will supply power to the shaft 22 and, if the clutch 31 is actuated, via the shaft 22 to the shaft 32 for the operation of the pumps 5 and 6. It is only when discharge has proceeded so far that there is no longer sufficient drive power for the pumps 5 and 6 that the latter will be driven again by the engine 1 in the manner indicated in connection with FIG. 1.

In order to prevent the equipment 4 from being accidentally made operational, it is possible to have a device 40 which monitors the speed of the transmission output shaft 11 and supplies a respective signal to a controller 41. The latter is so constructed that it only supplies a control signal for operation of the clutch 31 to the actuator 42 thereof if the vehicle is stationary or is moving at a speed under 10 kmph (kilometers per hour).

What is claimed is:

1. A utility vehicle adapted for frequent stopping and starting comprising:
   hydraulically operated power means,
   a driving prime mover,
   a hydromechanical transmission including power input and output shafts,
   a secondary power output drive including a clutch,
   hydraulic power circuitry for driving said hydraulically operated power means including at least one pump with a driving shaft, means for operating said clutch to connect said driving shaft to said secondary power output drive, said transmission including a four-shaft power branching mechanical transmission portion adapted for operation in two operational ranges and a hydraulic portion including at least first and second interconnected hydroconverters, said first hydroconverter being connected to a secondary drive shaft of said transmission at least when the vehicle moves from rest and to be stationary when said vehicle is stationary and said prime mover is running, said second hydroconverter being connected to a connection shaft which is distinct from said input shaft, said driving shaft for driving said at least one pump being coupled via said clutch to said connection shaft for drive of said hydraulically operated power means, means for monitoring the speed of the transmission output shaft, controller means connected to the speed monitoring means, and actuator means connected to said clutch to operate the same, said controller means being connected to said actuator means and being operative to activate the actuator means and thereby said clutch when the vehicle is at rest or the speed of the vehicle is less than 10 Kmph.

2. The utility vehicle as claimed in claim 1 wherein said hydromechanical power branching transmission is associated with a brake energy recovery device, comprising:

a high pressure accumulator, a low pressure accumulator, a controller, connecting lines extending from the controller to the accumulators, and controlled shut off valves said hydraulic power circuitry of the vehicle being able to be powered via the second hydroconverter selectively by the high pressure accumulator as the latter discharges and by the said prime mover.

3. The utility vehicle as claimed in claim 1 wherein the shaft of the second hydroconverter, which is able to be connected via the clutch with the at least one pump of the hydraulic power circuitry, is arranged to turn at a speed which is proportional to the speed of the prime mover when said vehicle is stationary.

* * * * *